3,227,704
WATER-SOLUBLE, METAL-CONTAINING
REACTIVE DISAZO DYES
August Schweizer, Muttenz, Basel-Land, and Hanspeter Uehlinger, Basel, Switzerland, assignors to Sandoz Ltd., Basel, Switzerland
No Drawing. Filed Jan. 23, 1962, Ser. No. 168,268
Claims priority, application Switzerland, Jan. 27, 1961, 1,004/61
7 Claims. (Cl. 260—146)

The present invention relates to water-soluble, metal-containing reactive disazo dyes, which in the metal-free state correspond to the formula

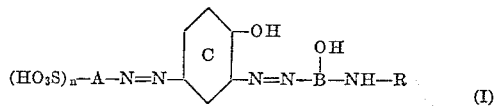

(I)

wherein

A represents a radical of the benzene or naphthalene series, which besides sulfonic acid groups may contain other substituents, B represents the radical of a coupling component of the pyrazolone, benzene or naphthalene series which contains the hydroxy group in the adjacent position to the azo group and may contain further substituents, R represents an organic radical which makes possible formation of the chemical linkage with the substrate, and $n$ represents one of the integers 1, 2 or 3, and wherein the nucleus C may contain further substituents.

The process for the production of the new dyes comprises coupling 1 mol of the diazo compound of an aminomonoazo dye of the formula

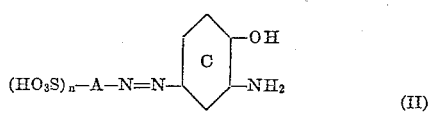

(II)

wherein A, C and $n$ possess the aforenamed meanings, with 1 mol of a compound of the formula

(III)

wherein X represents H or the radical R, and B possesses the aforenamed meaning, in the adjacent position to the hydroxy group, and treating the resulting aminodisazo dye, when X stands for the radical R, with a metal-yielding agent, or, when X stands for H, treating it in either order with a metal-yielding agent and a reactive component of the formula R—Hal    (IV)

wherein Hal represents chlorine or bromine and R has the aforenamed meaning.

A modification of the process comprises coupling 1 mol of the diazo compound of an aminomonoazo dye of the formula

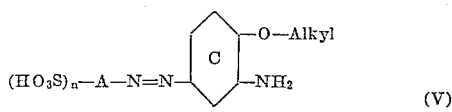

(V)

wherein A, C and $n$ have the aforenamed meanings and alkyl represents methyl or ethyl, with 1 mol of a compound of the formula

(VI)

wherein B has the aforenamed meaning, in the adjacent position to the hydroxy group and treating the resulting aminodisazo dye with a metal-yielding agent under dealkylating conditions and then reacting it with a reactive component R—Hal, wherein R and Hal have the aforenamed meanings.

A second modification of the process comprises coupling in acid medium 1 mol of the diazo compound of an aminoazo dye of Formula II with 1 mol of the compound of formula alkyl—O—B$_1$—NH$_2$    (VII)

wherein B$_1$ represents a benzene radical coupling in para position to —NH$_2$ and in ortho position to alkyl—O— and alkyl represents methyl or ethyl, and treating the resulting disazo dye with a metal-yielding agent under dealkylating conditions and then reacting it with a reactive component R—Ral, wherein R and Hal have the aforenamed meanings.

The substituents on the nucleus C are preferably low molecular alkyl and alkoxy groups (methyl, ethyl, methoxy, ethoxy) or halogen atoms (fluorine, chlorine, bromine).

The diazo components on which the radical

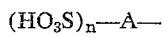

in Formula II may be based are e.g. 1-aminobenzene-2-, -3- or -4-sulfonic acid, 1-amino-2-methylbenzene-4- or -5-sulfonic acid, 1-amino-4-methylbenzene-2- or -3-sulfonic acid, 1-aminobenzene-2,4-, -2,5- or -3,5-disulfonic acid, 1-amino-2-chloro-, 1-amino-2-methyl- or 1-amino-2-methoxy-3,5-disulfonic acid, 1-aminonaphthalene-4-, -5-, -6-, -7- or -8-sulfonic acid, 2-aminonaphthalene-1-, -5- or -6-sulfonic acid, 1-aminonaphthalene-3,6- or -3,7-disulfonic acid, 1-aminonaphthalene-4,6- or -4,7-disulfonic acid, 1-aminonaphthalene-3,6,8-trisulfonic acid, 1-aminonaphthalene-4,6,8-trisulfonic acid, 2-aminonaphthalene-1,5-disulfonic acid, 2-aminonaphthalene - 4,8 - disulfonic acid, 2-aminonaphthalene-5,7-disulfonic acid, 2-aminonaphthalene-3,6-disulfonic acid, 2-aminonaphthalene-6,8-disulfonic acid, 2-aminonaphthalene-1,5,7-trisulfonic acid, 2-aminonaphthalene-3,6,8-trisulfonic acid, 2-aminonaphthalene - 4,6,8 - trisulfonic acid, 2-(4'-aminophenyl)-6-methyl-benzothiazole-7,3'-disulfonic acid.

The amines on which the coupling components of Formula III are based are e.g. 1-hydroxy-3-aminobenzene (acid coupled), 1-hydroxy-3-amino-4-methylbenzene, 1-(3'-aminophenyl)-3-methyl-5-pyrazolone, 1-(4'-aminophenyl) - 3 - methyl - 5 - pyrazolone, 1 - (4'-amino - 2' - sulfophenyl) - 3 - methyl - 5 - pyrazolone, 1 - (5' - amino - 2' - sulfophenyl) - 3 - methyl - 5 - pyrazolone, 1 - (3' - amino - 2' - methyl -'5' - sulfophenyl) - 5-pyrazolone-3-carboxylic acid, 1-amino-5-hydroxy-naphthalene-7-sulfonic acid, 2-amino-3-hydroxynaphthalene-6-sulfonic acid, 2-amino-5-hydroxy-naphthalene-7-sulfonis acid, 2-amino-6-hydroxynaphthalene-8-sulfonic acid, 2-amino-8-hydroxy-naphthalene-6-sulfonic acid, 1-amino-8-hydroxynaphthalene-3,6-disulfonic acid, 1-amino-8-hydroxnaphthalene-4,6-disulfonic acid, 2-amino-3-hydroxynaphthalene-5,7-disulfonic acid, 2-amino-5-hydroxynaphthalene-1,7-disulfonic acid and 2-amino-8-hydroxynaphthalene-3,6-disulfonic acid.

The aminomonoazo dyes of Formula II are produced by coupling the diazo compounds of the above-named diazo components with a substituted or unsubstituted 1-hydroxy-2-acylaminobenzene, e.g. 1-hydroxy-2-formyl-, -acetyl- or -propionyl-aminobenzene or 1-hydroxy-2-acetylamino-5-methylbenzene in alkaline medium at temperatures of 0° to 10° C. and saponifying the acylamino group, preferably in alkaline medium, e.g. in 2–10% sodium or potassium hydroxide solution, at 70–100° C., if necessary in presence of an organic solvent such as alcohol. The amino-hydroxyazo compound is isolated, diazotized in the normal way either directly or indirectly, and the diazo compound then coupled with the coupling component of Formula III at 0–30° C. in neutral to alkaline medium, if necessary in presence of teritary amines which accelerate the rate of the coupling reaction, e.g. pyridine or a mixture of pyridine bases. As the diazoalkoxyazo compounds possess a greater energy of coupling than the diazohydroxyazo compounds it is sometimes advisable to alkylate the hydroxy group in the acylaminohydroxymonoazo compounds obtained by the first coupling, with e.g. dimethyl sulfate or methyl chloride, before the acylamino group is hydrolysed. The coupling of the ortho-diazo-alkoxy-azo compounds with the coupling components of the Formula VI is also carried out at 0–30° C. in neutral to alkaline medium, if necessary in presence of tertiary amines which accelerate the rate of the coupling reaction, e.g. pyridine or a mixture of pyridine bases. With the aminodisazo dyes produced in this way, which contain one o-hydroxy-o'-alkoxyazo grouping, the metallizing reaction is normally carried out prior to condensation of the aminodisazo compound with the reactive component, under conditions which lead to cleavage of the alkoxy group in the ortho position to the azo group, e.g. by several hours' heating in presence of copper sulfate and an excess of ammonia. On acid coupling of ortho-diazohydroxyazo compounds with coupling components, e.g. 1-amino-3-methoxy-, -3-ethoxy- or -2,5-dimethoxybenzene, o-hydroxy-o'-alkoxy disazo dyes are obtained which must be metallized under dealkylating conditions, preferably before the reaction with the reactive component. On the other hand, the acid coupling of ortho-diazo-alkoxy-azo compounds with coupling components such as e.g. 1-amino-3-methoxy-, -3-ethoxy- or -2,5-dimethoxybenzene is not suitable because the resulting o,o'-dialkoxy-disazo dyes are not metallizable.

In place of the coupling components of Formula III, their derivatives substituted on the amino group by nonreactive acyl groups, e.g. acetyl, propionyl, benzoyl or carbethoxy groups, can be used. These couple in alkaline medium in the ortho position to the hydroxy group and after coupling the acyl group is split off by acid or alkaline hydrolysis. However, as a rule the use of these acyl derivatives offers no special advantages.

The substituent R in Formula I is preferably the radical of an acid containing at least on mobile halogen atom and/or a C—C multiple linkage capable of addition, e.g. the radical of an aliphatic saturated halogenated carboxylic acid or of an aliphatic unsaturated halogenated or unhalogenated carboxylic acid such as chloroacetic, bromoacetic, β-chloro- or β-bromopropionic, α,β-dichloro- or α,β-dibromopropionic, acrylic, methacrylic, α-chloro- or α-bromo-acrylic, α,β- or β,β-dichloro- or -dibromo-acrylic, β- or γ-chlorocrotonic, β- or γ-bromocrotonic acid, or the radical remaining after the cleavage of a chlorine or bromine atom, of a halogenated heterocyclic compound, e.g. of di- or trihalogenotriazine such as cyanuric chloride, cyanuric bromide, primary condensation products of a cyanuric halide of the composition:

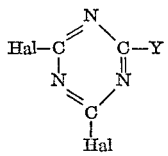

wherein Hal represents chlorine or bromine and Y the radical, which may be further substituted, of a primary or secondary aliphatic, alicyclic, aromatic or heterocyclic amine, an aliphatic, alicyclic, aromatic or heterocyclic hydroxy or thiol compound, in particular the radical of aniline, its alkyl and sulfonic acid or carboxylic acid derivatives, low molecular mono- and di-alkyl amines, the radical of ammonia itself; the radical remaining after the cleavage of a chlorine or bromine atom, of a polyhalogenated pyrimidine such as 2,4,6-trichloropyrimidine, 2,4,6-tribromopyrimidine, their derivatives which contain in the 5-position, for example, the following substituents: methyl, ethyl, alkylene, e.g. allyl, chlorovinyl, bromovinyl, substituted alkyl, e.g. carboxymethyl, chloro- or bromomethyl, 2,4,5,6-tetrachloro- or -tetrabromo-pyrimidine, 2,6-dichloro- or dibromo-pyrimidine-4-carboxylic acid methyl or ethyl ester, 2,6-dichloro- or -dibromo-pyrimidine, 2,4,5 - trichloro- or 2,4,5 - tribromo-pyrimidine, 2,5,6-trichloro- or 2,5,6 - tribromo - 4 - methylpyrimidine, 2,4-dichloro-5-chloromethyl-6-methylpyrimidine, 2,4 - dibromo-5-bromomethyl-6-methylpyrimidine, 2,4-dichloro-5-chloromethylpyrimidine, 2,4 - dibromo-5-bromomethylpyrimidine, and 2,6-dichloro-4-trichloromethyl- or -4-methylpyrimidine.

Generally, the introduction of the acid radicals is most easily effected by using the corresponding acid halides or in certain cases the acid anhydrides. It is preferable to work at low temperatures, e.g. 0° to 20° C., and in presence of acid-binding agents such as sodium carbonate, sodium hydroxide, calcium hydroxide, or sodium acetate at a weakly acid, neutral or weakly alkaline reaction, e.g. in the pH region of 4 to 9. For acylation, the carboxylic acid chlorides, as such or in solution in two to five times their amount of benzene, chlorobenzene, methylbenzene, dimethylbenzene or acetone, are added dropwise to the well buffered solution of the compound containing the amino group at a temperature of e.g. 2–5° C. Acylation with the anhydrides can be carried out in the same way. The introduction of a dihalogenocyanuric radical is best accomplished in aqueous medium at about 0° C. and at a weakly acid reaction, e.g. at pH values between 3 and 5. The cyanuric chloride is used as such in solid form or in solution in an organic solvent, e.g. acetone. For the primary condensation products of a cyanuric halide it is best to choose a temperature of 30° to 60° C. and a pH value of 4 to 6, while for the di-, tri- and tetra-halogenopyrimidines temperatures between 40° and 100° C. are the most suitable. If temperatures higher than about 40° C. are applied, it is advisable to work in vessels equipped with reflux condensers in view of the volatility of certain halogenopyrimidines in steam. The reaction may be carried out in weakly alkaline, neutral to weakly acid medium but preferably within the pH region to 9 to 3. To maintain a constant pH value an acid-binding agent, e.g. sodium acetate, or a phosphate buffer is added to the reaction mixture at the start of the reaction, or small portions of sodium or potassium carbonate or bicarbonate are added in solid, pulverized form or as an aqueous solution during the reaction. Aqueous solutions of sodium or potassium hydroxide are also suitable as neutralizing agents. The addition of small amounts of a wetting or emulsifying agent to the reaction mixture can accelerate the rate of reaction.

The reaction with the halogenated heterocyclic compounds is carried out in such a way that only one halogen atom reacts with an exchangeable hydrogen atom of the amino group.

The conversion of the o,o'-dihydroxydisazo dyes into their copper or nickel complex compounds is carried out to best advantage in weakly acid, aqueous solution. One mol of disazo dye is allowed to act upon an amount of a metal-yielding agent containing one atom of metal.

Suitable copper compounds are e.g. cupric sulfate, cupric formate, cupric acetate or cupric chloride. Examples of suitable nickel compounds are nickel formate, nickel acetate and nickel sulfate.

The resulting metal complex compounds which contain at least one reactive group are precipitated from their aqueous solutions by the addition of salt, filtered off, washed if necessary and dried.

The metal-containing azo dyes thus obtained are homogeneous metal complex compounds in which essentially one atom of metal is combined with one molecule of disazo compound.

The conversion of the o,o'-dihydroxy-disazo dyes into their chromium or cobalt complex compounds is carried out preferably in aqueous solution or in organic medium, for example formamide, or in the concentrated aqueous solution of an alkali metal salt of a low molecular aliphatic monocarboxylic acid. It is of advantage to allow an amount of metal-yielding agent containing less than two but at least one atom of metal to act upon two molecules of disazo dye.

Suitable chromium compounds are e.g. chromic fluoride, chromic sulfate, chromic formate, chromic acetate, chromic potassium sulfate and chromic ammonium sulfate. The chromates, e.g. sodium or potassium chromate and bichromate, are also highly suitable for metallizing the disazo dyes. In the last case it is advantageous to work in a strongly caustic alkaline medium to which reducing substances can be added if desired.

Examples of suitable cobalt compounds are cobaltous formate, cobaltous acetate and cobaltous sulfate. When metallization is carried out in the concentrated aqueous solution of an alkali metal salt of a low molecular aliphatic monocarboxylic acid, water-insoluble metal compounds, e.g. cobalt hydroxide or cobalt carbonate, can also be employed.

It is especially advantageous to carry out metallization in an aqueous alkaline medium, to which the metal compounds are added in presence of compounds which maintain the metals dissolved in complex combination in caustic alkaline medium, e.g. tartaric, citric or lactic acid.

The chromium- or cobalt-containing azo dyes which contain at least one reactive group are homogeneous metal complex compounds in which essentially one atom of metal is combined to two molecules of disazo compound. These metal complex compounds are so-called 1:2 complexes in which one molecule of disazo compound is combined with approximately 0.3 to 0.7 atom of metal.

The organic metallizing solutions can be run into brine if desired, and the metal complex compounds formed are then precipitated by the addition of salt, filtered off, washed if necessary, and dried.

The new metal-containing reactive dyes are suitable for the dyeing, of leather; the dyeing, padding and printing of fibers of animal origin, e.g. wool and silk; synthetic polyamide fibers, e.g. nylon; cellulosic fibers, e.g. cotton, linen; regenerated cellulosic fibers, e.g. viscose filament yarn, viscose staple fiber and cuprammonium rayon; and mixtures and/or other articles of these fibers. The optimum conditions of application vary with the nature of the fiber and the dyes used.

The copper- or nickel-containing disazo dyes which bear 3 or more water-solubilizing groups, e.g. carboxylic or preferably sulfonic acid groups—other groups such as alkylsulfonyl or optionally substituted sulfonic acid amide groups have a limited importanec becaues their introduction into the molecule is rather difficult—the chromium- or cobalt-containing disazo dyes which bear 2 or more water-solubilizing groups for each molecule of the Formula I possess good solubility in water, good stability in printing pastes and padding liquors, good compatibility to salts and hard water, good reactivity with vegetable fibers, animal and synthetic polyamide fibers; they are insensitive to heavy metals such as copper, iron and chromium and reserve acetate, triacetate, polyester, polyacrylonitrile, polyvinyl chloride, polyvinyl acetate and polyalkylene fibers. Owing to their rather slight substantivity the unfixed dye portion can easily be removed from the dyeings and prints on cellulosic fibers.

The copper- or nickel-containing disazo dyes which bear 2 to 3 water-solubilizing groups are especially suitable for the so-called exhaustion dyeing of cellulosic fibers, whereas for the chromium- or cobalt-containing disazo dyes which bear 1 to 2 water-solubilizing groups for each molecule of the Formula I the principal application field is the normal acid dyeing of wool, silk and synthetic polyamide fibers.

Animal fibers and synthetic polyamide fibers are dyed, printed or fixed preferably in acid, neutral or weakly alkaline medium e.g. in presence of acetic, formic or sulfuric acid, ammonium sulfate, sodium metaphosphate, etc. Dyeing can be carried out in a neutral to acetic acid medium in presence of levelling agents, e.g. polyoxethylated fatty amines or mixtures of these and alkylpolyglycol ethers, and the bath adjusted to a neutral or weakly alkaline reaction at the end of dyeing by the addition of small amounts of an agent of alkaline reaction, e.g. ammonia, sodium bicarbonate, sodium carbonate, etc., or of compounds which react alkaline on heating, e.g. hexamethylene tetramine, urea. The goods are then well rinsed and if necessary soured with a little acetic acid.

The dyeing, padding and printing or fixing of the dyes on cellulosic fibers is carried out advantageously in alkaline medium, e.g. in presence of sodium bicarbonate, sodium carbonate, sodium hydroxide solution, potassium hydroxide solution, sodium metasilicate, sodium borate, trisodium phosphate, ammonia, etc. To prevent reduction effects during dyeing, padding or printing it is often advantageous to use a mild oxidizing agent, e.g. sodium 1-nitrobenzene-3-sulfonate. The fixation of the dyes on cellulosic fibers is carried out as a rule with heating. Depending on the reactivity of the reactive groups, certain of the dyes can be dyed or fixed at lower temperatures, e.g. 20–40° C.

The addition of certain quaternisable amines such as trimethylamine, triethylenediamine, asymmetric dimethylhydrazine, preferably in stoichiometric amounts, accelerates the fixation of the dye on the fiber, so that the fixation temperature can be lowered and/or the fixation time shortened.

The dyeings and prints on cellulosic fibers are notable for their outstanding wet fastness properties which are due to the formation of a chemical linkage between the dye molecule and the cellulose molecule. Often the total amount of applied dye does not take part in the reaction, in which case the unfixed dye is removed by suitable treatment such as rinsing and/or soaping, if necessary at higher temperature. For this purpose synthetic detergents, e.g. alkylarylsulfonate, sodium lauryl sulfate, sodium lauryl polyglycol ether sulfate, optionally carboxymethylated alkylpolyglycol ethers, mono- and di-alkylphenylpolyglycol ethers, can be used. Brown, violet, blue, olive, gray and black dyeings and prints are obtained, which possess good fastness to light, washing, water, sea water, potting, milling, perspiration, rubbing, alkali, acids, vlucanizing, chlorine, bleaching (peroxides), gas fumes and dry cleaning (organic solvents). In addition they are stable to resin finishing and to acid and alkaline hydrolytic influences.

In the following examples the parts and percentages are by weight and the temperatures in degrees centigrade.

*Example 1*

42.3 parts of the monoazo dye 2-(3-'-amino-4'-hydroxyphenylazo)-naphthalene-4,8-disulfonic acid in the form of the neutral sodium salt are dissolved in 500 parts of water. A concentrated aqueous solution of 6.9 parts of sodium nitrite is added at 15° and the solution adjusted to a mineral acid reaction by the addition of 30 parts of 30% hydrochloric acid. The resulting brown diazo compound is almost completely precipitated from the solution.

The suspension of the diazo compound is run into a solution of 32 parts of 1-amino-8-hydroxynaphthalene-3,6-disulfonic acid, 500 parts of water, 50 parts of pyridine and 50 parts of sodium carbonate at 15°. On completion of coupling the olive-green solution of the disazo dye obtained is rendered mineral acid by the addition of 30% hydrochloric acid, on which the dyestuff is precipitated. It is filtered off and washed thoroughly with an aqueous hydrochloric acid solution of common salt.

The dark brown acid filter cake is suspended in 1500 parts of water at 60° and the dye brought into solution by neutralizing with 30% sodium hydroxide solution. 20 parts of crystallised sodium acetate are added, and an aqueous solution of 20 parts of crystallized copper sulfate run in at 60° and a pH value of 4–5. The copper complex compound formed remains in solution with a blue-gray coloration. After metallization 18 parts of 2,4,5,6-tetrachloropyrimidine are added and the condensation solution stirred for 3–4 hours at 80° in a closed reaction vessel fitted with a reflux condenser. During this time the reaction solution is maintained at a constant pH value of 5–6 by the addition of aqueous sodium carbonate solution. On completion of the reaction, sodium chloride is added and the solution left to cool. The condensation product precipitates. It is filtered with suction and washed with dilute sodium chloride solution. On drying, a dark powder is obtained which dissolves in water with a red-violet coloration.

A mercerized cotton fabric is printed with a printing paste of the following composition:

50 parts of the dye obtained by the procedure described above
100 parts of urea
365 parts of water
450 parts of a 3% sodium alginate thickening
10 parts of sodium 1-nitrobenzene-3-sulfonate
25 parts of sodium carbonate 1000 parts The print is dried, steamed for 10 minutes at 102–104°, rinsed in cold and warm water, soaped at the boil, rinsed again and dried. A reddish black print is obtained which has very good wet and light fastness.

A pad dyeing is carried out in the following way:

3 parts of the dye obtained by the procedure described above are dissolved in 100 parts of warm water and subsequently 30 parts of a 10% sodium carbonate solution and 0.5 part of sodium 1-nitrobenzene-3-sulfonate are added. A spun rayon fabric is impregnated with this solution so that it contains 75% of its weight of moisture. The fabric is dried and then treated in moist steam for 5 to 10 minutes at 102°. It is rinsed in hot and cold water, soaped at the boil, rinsed again in hot and cold water and dried. A reddish black dyeing is obtained which has very good wet and light fastness properties.

*Example 2*

29.3 parts of the monoazo dye 3-amino-4-hydroxy-1,1'-azobenzene-4'-sulfonic acid are diazotized according to the particulars of Example 1. The suspension of the diazo compound is run into an ice-cooled solution of 50 parts of 1-(2',5',6'-trichloro-pyrimidyl-4')-amino-8-hydroxynaphthalene-3,6-disulfonic acid, 800 parts of water, 50 parts of a mixture of pyridine bases and 50 parts of sodium carbonate. On completion of coupling the mass is acidified with 30% hydrochloric acid, the precipitated disazo dye filtered off and washed with an aqueous hydrochloric acid solution of sodium chloride.

The dye paste is added to 1000 parts of water at 75° and the suspension brought to a pH value of 5 with aqueous sodium carbonate solution. A concentrated aqueous solution of 14 parts of crystallized cobalt sulfate is run in at 75–80°, the pH value being maintained between 4 and 5 by the simultaneous addition of sodium carbonate solution. On completion of metallization the cobalt complex compound is precipitated with sodium chloride, filtered off and washed with sodium chloride solution. It is dried and ground. The dye is obtained as a brown-black powder which dissolves in water with a dark gray coloration.

The dye is printed according to the printing recipe and method given in Example 1; a brownish black print of very good wet and light fastness is obtained.

2 parts of the above dye, 0.8 part of an oxethylated fatty amine and 0.5 part of an oleylpolyglycol ether are dissolved in 5000 parts of water and 2 parts of glacial acetic acid are added. This dyebath is heated to 40–50°. 100 parts of wool are entered and the bath brought to the boil in 30 minutes, and boiling continued for 45 minutes. The material is then rinsed and dried. A level, brownish gray dyeing of good light and wet fastness is obtained. When at the end of the dyeing process the bath is neutralized with ammonia and the goods treated for 20 minutes at 90°, a dyeing of better wet fastness is obtained. The same effect can be obtained by treating the goods for 20–30 minutes at 90–95° in a fresh bath containing 5000 parts of water and 3 parts of hexamethylene tetramine.

*Example 3*

50.3 parts of the monoazo dye 2-(3'-amino-4'-hydroxyphenylazo)-naphthalene-4,6,8-trisulfonic acid are dissolved in 300 parts of water and sufficient sodium hydroxide solution to give a neutral solution. 6.9 parts of sodium nitrite are added and the solution cooled to 10°. 35 parts of 30% hydrochloric acid are then added in a thin jet. The resulting brown diazo compound is partially precipitated.

13 parts of 3-amino-1-methoxybenzene and 40 parts of crystallized sodium acetate are added to this diazo suspension and the reaction mixture stirred at 15–20° until coupling is completed. The dye suspension is heated to 80°, rendered mineral acid with 10% hydrochloric acid, then a little sodium chloride is added and the precipitated aminodisazo dye filtered off. The residue is washed with a warm sodium chloride solution containing hydrochloric acid.

The dye paste is dissolved in a mixture of 1000 parts of water, 70 parts of 25% ammonium hydroxide solution and 10 parts of diethanolamine at 90° in a stirring vessel fitted with a reflux condenser. A concentrated aqueous solution of 22 parts of crystallized copper sulfate is added and stirring continued at 90° for several hours. Metallization takes place with cleavage of the methoxy group. On completion of metallization the copper-containing aminodisazo dye is salted out with sodium chloride, filtered off and washed with dilute sodium chloride solution.

The dye paste is dissolved in 2000 parts of water at 20° and the pH value brought to 5 with dilute acetic acid. 11 parts of β-chloropropionyl chloride are evenly dropped in in the course of 1 hour, the pH value of the reaction solution being maintained between 4 and 6 by the addition of sodium carbonate solution. On completion of the reaction, the dye is salted out with sodium chloride, filtered off and washed with dilute sodium chloride solution. The dye paste is dried to give a dark brown powder which dissolves in water with a violet-brown coloration.

This dye, when printed on mercerized cotton by the method and recipe given in Example 1, gives brown prints of very good light and wet fastness.

*Example 4*

50 parts of the monoazo dye 1-(3'-acetylamino-4'-hydroxyphenylazo)-naphthalene-4,6-disulfonic acid are methylated at a slightly increased temperature in sodium hydroxide solution with dimethyl sulfate, purified by redissolving and reprecipitating and hydrolyzed in 5% sodium hydroxide solution at 90–98°.

43.7 parts of the 1-(3'-amino-4'-methoxyphenylazo)-naphthalene-4,6-disulfonic acid obtained in this way are diazotized according to the particulars of Example 1. The suspension of the diazo compound is run into an ice-cold solution of 27 parts of 1-(4'-amino-2'-sulfonphenyl)-3-methyl-5-pyrazolone in 300 parts of water and 40 parts of sodium carbonate. On completion of coupling the aminodisazo dye obtained is salted out by heating and adding sodium chloride, filtered off and washed with dilute sodium chloride solution.

The dye paste is dissolved in 1000 parts of water at 80° and stirred together with 60 parts of 25% ammonium hydroxide solution and 25 parts of crystallized copper sulfate for several hours at 90–95° in a stirring vessel fitted with a reflux condenser. The corresponding copper complex compound is formed with cleavage of the methoxy group. It is precipitated with sodium chloride, filtered off and washed with dilute sodium chloride solution.

The dye paste is dissolved in 1800 parts of water at 20°, and the solution run slowly into an ice cooled suspension of 16 parts of finely powdered cyanuric chloride in 200 parts of water. The pH value of the reaction mixture is maintained between 4 and 5 with sodium carbonate solution. On completion of condensation the resulting dichlorotriazinyl dye is salted out with sodium chloride, filtered off, washed with dilute sodium chloride solution and dried with vacuum at 40°. A brown powder is obtained which dissolves in water with a brown coloration and dyes cellulosic fibers from soda alkaline baths in presence of sodium sulfate at 25–35° in brown shades fast to light and wet treatments.

When the dichlorotriazinyl dye obtained in this example is treated with a dilute aqueous ammonia solution for several hours at 40–50°, the corresponding monochlorotriazinyl dye is obtained. It is precipitated with sodium chloride, filtered off and dried. The dye is a brown powder which dissolves in water with a brown coloration and, applied by the printing recipe in Example 1, gives brown prints on mercerised cotton fabric of very good light and wet fastness.

In the following table are listed further reactive metal-containing disazo dyes which in the metal-free state correspond to Formula I and are obtainable by the procedures described in Examples 1 to 4.

The positions of the nucleus C are numbered as follows:

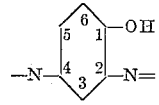

| Example No. | $(HO_3S)_n$—A— = Radical of (I) | Nucleus C Substituent (II) | Nucleus C Position (III) | OH<br>\|<br>—B—NH—R = Radical of (IV) | R = Radical of (V) | Metal (VI) | Shade of the print or dyeing on cotton (VII) | Shade of the dyeing on wool (VIII) |
|---|---|---|---|---|---|---|---|---|
| 5 | 2-aminonaphthalene-4,8-disulfonic acid. | | | 3-R-amino-2-hydroxy-naphthalene-5,7-disulfonic acid. | 2,4,5,6-tetrachloro-pyrimidine. | Cu | Violetty brown. | |
| 6 | ---do--- | | | 1-(3'-R-amino-phenyl)-3-methyl-5-pyrazolone. | ---do--- | Co | Orange brown. | Orange brown. |
| 7 | 2-aminonaphthalene-4,6,8-trisulfonic acid. | | | ---do--- | ---do--- | Cu | Yellowish brown. | |
| 8 | ---do--- | | | 3-R-amino-4-methyl-1-hydroxybenzene. | ---do--- | Cu | Brown. | |
| 9 | 1-aminobenzene-2,5-di-sulfonic acid. | CH₃ | 5 | ---do--- | 2-(3'-sulfophenyl-amino)-4,6-dichloro-1,3,5-triazine. | Co | ---do--- | Brown. |
| 10 | ---do--- | | | ---do--- | 2,4,6-trichloro-1,3,5-triazine. | Cr | Violet-brown. | Violet-brown. |
| 11 | 2-aminonaphthalene-5,7-disulfonic acid. | | | 1-(3'-R-amino-6'-sulfophenyl)-3-methyl-5-pyrazolone. | β-Chloropropionyl chloride. | Cu | Yellowish brown. | |
| 12 | 1-aminobenzene-4-sulfonic acid. | | | 1-R-amino-8-hydroxy-naphthalene-3,6-disulfonic acid. | 2,4,5,6-tetrachloro-pyrimidine. | Cu | Reddish navy blue. | |
| 13 | ---do--- | | | ---do--- | ---do--- | Cr | Gray-olive. | Gray-olive. |
| 14 | 1-aminobenzene-3-sulfonic acid. | | | ---do--- | ---do--- | Cr | ---do--- | Do. |
| 15 | ---do--- | OCH₃ | 5 | ---do--- | ---do--- | Cr | ---do--- | Do. |
| 16 | 2-aminonaphthalene-1,5-disulfonic acid. | | | 2-R-amino-3-hydroxy-naphthalene-6-sulfonic acid. | ---do--- | Cr | Gray-brown. | Gray-brown. |
| 17 | 2-aminonaphthalene-4,6,8-trisulfonic acid. | | | 1-R-amino-8-hydroxy-naphthalene-3,6-disulfonic acid. | ---do--- | Cu | Gray-blue. | |
| 18 | ---do--- | | | ---do--- | 2,4,6-trichloropyrimidine. | Cu | ---do--- | |
| 19 | 1-aminonaphthalene-3,6,8-trisulfonic acid. | | | ---do--- | ---do--- | Cu | ---do--- | |
| 20 | ---do--- | | | ---do--- | 2,4,5,6-tetrachloro-pyrimidine. | Cu | ---do--- | |
| 21 | 1-aminobenzene-2,5-disulfonic acid. | | | ---do--- | ---do--- | Cu | Reddish navy blue. | |
| 22 | ---do--- | | | ---do--- | ---do--- | Ni | Reddish blue. | |
| 23 | 2-aminonaphthalene-3,5,7-trisulfonic acid. | | | 1-R-amino-2-methoxy-5-hydroxy-benzene (acid coupling). | ---do--- | Cu | Brown. | |
| 24 | 1-amino-2-methyl-benzene-4-sulfonic acid. | | | 1-(4'-R-amino-2'-sulfopheny)-3-methyl-5-pyrazolone. | Chloracetyl chloride. | Cr | Red-brown. | Red-brown. |
| 25 | 1-aminobenzene-2-sulfonic acid. | | | 2-R-amino-5-hydroxynaphthalene-1,7-disulfonic acid. | Bromacetyl chloride. | Co | Gray-blue. | Gray-blue. |
| 26 | 1-aminobenzene-3,5-disulfonic acid. | | | 2-R-amino-5-hydroxynaphthalene-7-sulfonic acid. | 2,4,6-trichloro-5-carboxymethylpyrimidine. | Cu | Brown. | |
| 27 | 1-aminonaphthalene-4-sulfonic acid. | | | 2-R-amino-6-hydroxynaphthalene-8-sulfonic acid. | ---do--- | Cr | Blue. | Blue. |
| 28 | 1-aminonaphthalene-3,7-disulfonic acid. | | | 2-R-amino-8-hydroxynaphthalene-6-sulfonic acid. | 2,4,6-trichloro-5-ethyl-pyrimidine. | Ni | Brown. | |
| 29 | ---do--- | | | ---do--- | 2,4,5,6-tetrabromo-pyrimidine. | Cu | ---do--- | |
| 30 | ---do--- | | | ---do--- | 2-phylamino-4,6-dichloro-1,3,5-triazine. | Cu | ---do--- | |

| Example No. | $(HO_3S)_n$—A—= Radical of (I) | Nucleus C Substituent (II) | Nucleus C Position (III) | $\underset{\|}{\overset{OH}{-B-NH-R}}$ = Radical of (IV) | R = Radical of (V) | Metal (VI) | Shade of the print or dyeing on cotton (VII) | Shade of the dyeing on wool (VIII) |
|---|---|---|---|---|---|---|---|---|
| 31 | 2-(4'-aminophenyl)-6-methyl-benzothiazol-7,3'-disulfonic acid. | | | ...do... | 2,4,5,6-tetrachloropyrimidine. | Co | Blue | |
| 32 | ...do... | | | 2-R-amino-5-hydroxynaphthalene-7-sulfonic acid. | 2,4-dichloro-5-chloromethyl-6-methylpyrimidine. | Co | ...do... | |
| 33 | ...do... | $CH_3$ | 5 | 1-R-amino-8-hydroxynaphthalene-3,6-disulfonic acid. | 2,4,6-tribromopyrimidine. | Cu | Gray-blue | |
| 34 | ...do... | $CH_3$ | 5 | 2-R-amino-5-hydroxynaphthalene-7-sulfonic acid. | Chloracetyl chloride. | Cr | Blue | Blue. |
| 35 | ...do... | | | ...do... | 2-methylamino-4,6-dichloro-1,3,5-triazine. | Cr | ...do... | |
| 36 | ...do... | | | 1-(5'-R-amino-2'-sulfophenyl)-3-methyl-5-pyrazolone. | 2,4,6-trichloro-1,3,5-triazine. | Cr | Red-brown | |
| 37 | ...do... | | | ...do... | 2,4,6-trichloro-5-methylpyrimidine. | Cr | ...do... | |
| 38 | ...do... | | | ...do... | α-Chloracrylyl chloride. | Co | Brown | |
| 39 | ...do... | | | 3-R-amino-1-hydroxybenzene (acid coupling). | α-Bromacrylyl chloride. | Cr | ...do... | |
| 40 | ...do... | | | ...do... | 2-amino-4,6-dichloro-1,3,5-triazine. | Cr | ...do... | |
| 41 | ...do... | | | 3-R-amino-1-hydroxy-4-methylbenzene. | 2,4,6-trichloro-5-carboxymethylpyrimidine. | Cr | ...do... | |
| 42 | 1-aminobenzene-3-sulfonic acid. | | | ...do... | Chloracetyl chloride. | Cr | ...do... | Brown. |
| 43 | 1-amino-2-methylbenzene-3,5-disulfonic acid. | | | ...do... | β-Bromopropionyl chloride. | Cr | ...do... | |
| 44 | 2-amino-naphthalene-3,6,8-trisulfonic acid. | | | ...do... | 2,4,6-trichloro-5-carbomethoxypyrimidine. | Cu | ...do... | |
| 45 | 1-aminonaphthalene-4,7-disulfonic acid. | | | 1-(4'-R-aminophenyl)-3-methyl-5-pyrazolone. | Chloracetyl chloride. | Co | ...do... | Do. |
| 46 | 1-amino-2-methylbenzene-5-sulfonic acid. | | | 1-R-amino-5-hydroxynaphthalene-7-sulfonic acid. | 2-(2'-sulfophenylamino)-4,6-dichloro-1'3,5-triazine. | Co | ...do... | Blue. |
| 47 | 1-aminobenzene-2,4-disulfonic acid. | Cl | 5 | 2-R-amino-1-hydroxy-4-methylbenzene. | γ-Chlorocrotonyl chloride. | Co | ...do... | |
| 48 | ...do... | | | ...do... | 2-(2'hydroxyethylamino)-4,6-dichloro-1,3,5-triazine. | Co | ...do... | |
| 49 | ...do... | | | ...do... | 2,4,6-trichloropyrimidine. | Co | ...do... | |
| 50 | 1-aminonaphthalene-5-sulfonic acid. | | | 1-R-amino-8-hydroxynaphthalene-4,6-disulfonic acid. | 2,4,6-trichloro-5-chlorovinylpyrimidine. | Cr | Olive | |
| 51 | 2-aminonaphthalene-1-sulfonic acid. | | | ...do... | 2,4-dichloro-5-chloromethylpyrimidine. | Cr | ...do... | |
| 52 | 1-aminonaphthalene-3,6-disulfonic acid. | | | ...do... | 2,4,6-tribromo-5-methylpyrimidine. | Cu | Gray-blue | |
| 53 | ...do... | | | ...do... | α,β-Dibromopropionic acid. | Cu | ...do... | |
| 54 | 1-aminobenzene-2,5-disulfonic acid. | | | ...do... | 2,4,6-tribromo-1,3,5-triazine. | Cu | ...do... | |
| 55 | 1-aminonaphthalene-4,6,8-trisulfonic acid. | | | ...do... | 2,4,5-6-tetrabromopyrimidine. | Cu | ...do... | |
| 56 | 1-aminonaphthalene-4,6,8-trisulfonic acid. | | | 1-R-amino-7-hydroxynaphthalene. | 2,4-dichloro-5-chloromethyl-6-methyl pyrimidine. | Co | Reddish blue | |
| 57 | ...do... | | | ...do... | 2-carboxymethylamino-4,6-dichloro-1,3,5-triazine. | Co | ...do... | |
| 58 | ...do... | | | ...do... | β-bromocrotonyl chloride. | Co | ...do... | |
| 59 | 1-aminobenzene-2,5-disulfonic acid. | | | ...do... | Chloracetyl chloride. | Co | ...do... | Reddish-blue. |
| 60 | ...do... | | | 2-R-amino-8-hydroxynaphthalene-3,6-disulfonic acid. | α,β,-dibromacrylyl chloride. | Cu | Brown | |
| 61 | ...do... | | | ...do... | 2-dimethylamino-4,6-dibromo-1,3,5-triazine. | Cu | ...do... | |
| 62 | ...do... | | | ...do... | 2,4,6-tribromo-5-bromovinylpyrimidine. | Cu | ...do... | |
| 63 | 1-amino-4-methylbenzene-2-sulfonic acid. | | | ...do... | 2,5,6-trichloro-4-methylpyrimidine. | Cr | Gray-blue | |
| 64 | 1-amino-4-methoxybenzene-2-sulfonic acid. | | | 2-R-amino-5-hydroxynaphthalene-7-sulfonic acid. | 2,6-dichloropyrimidine. | Cr | | Blue. |
| 65 | 1-amino-2-methoxybenzene-3,5-sulfonic acid. | $CH_3O$ | 5 | ...do... | 2,4,5-tribromopyrimidine. | Cr | Blue. | |
| 66 | 1-amino-2-methoxybenzene-3,5-disulfonic acid. | | | 2-R-amino-5-hydroxynaphthalene-7-sulfonic. | 2,4,6-trichloro-5-chloromethylpyrimidine. | Cr | Blue | |
| 67 | 1-amino-2-chlorobenzene-3,5-disulfonic acid. | | | ...do... | 2,6-dichloro-4-carbethoxy-pyrimidine. | Cr | ...do... | |
| 68 | ...do... | | | ...do... | 2-di-(2'-hydroxyethylamino)-4,6-dichloro-1,3,5-triazine. | Cr | ...do... | |

| Example No. | (HO³S)ₙ—A— = Radical of (I) | Nucleus C Substituent (II) | Nucleus C Position (III) | OH \| —B—NH—R = Radical of (IV) | R = Radical of (V) | Metal (VI) | Shade of the print or dyeing on cotton (VII) | Shade of the dyeing on wool (VIII) |
|---|---|---|---|---|---|---|---|---|
| 69 | 1-aminonaphthalene-6-sulfonic acid. | | | ...do... | 2-(2'-carboxyethyl)-amino-4,6-dichloro-1,3,5-triazine. | Cr | Gray-blue | |
| 70 | ...do... | | | ...do... | 2,4,6-trichloro-5-chloromethylpyrimidine. | Co | | Gray-blue. |
| 71 | 2-aminonaphthalene-5,7-disulfonic acid. | | | 1-R-amino-8-hydroxynaphthalene-3,6-disulfonic acid. | 2,4,6-tribromo-5-bromomethylpyrimidine. | Cu | Brown | |
| 72 | ...do... | | | ...do... | 2-diethylamino-4,6-dichloro-1,3,5-triazine. | Cu | ...do... | |
| 73 | 2-aminonaphthalene-3,6-disulfonic acid. | | | ...do... | 2-(4'-methoxybutyl-amino)-4,6-dichloro-1,3,5-triazine. | Cu | ...do... | |
| 74 | ...do... | | | ...do... | α,β-dichloropropionyl chloride. | Ni | ...do... | |
| 75 | 2-aminonaphthalene-5-sulfonic acid. | | | 1-R-amino-8-hydroxynaphthalene-3,6-disulfonic acid. | Acrylylchloride | Co | Black | |
| 76 | ...do... | | | ...do... | 2,6-dibromo-4-methylpyrimidine. | Cr | Olive | |
| 77 | 1-aminonaphthalene-8-sulfonic acid. | | | ...do... | 2,6-dichloro-4-carbomethoxypyrimidine. | Cr | ...do... | |
| 78 | 1-amino-4-methylbenzene-3-sulfonic acid. | CH₃ | 5 | ...do... | 2,6-dichloro-4-trichloromethylpyrimidine. | Co | Black | |
| 79 | ...do... | | | ...do... | 2-ethylamino-4,6-dichloro-1,3,5-triazine. | Cr | Olive | |
| 80 | 1-aminobenzene-4-sulfonic acid. | | | ...do... | 2-(3'-methoxypropyl-amino)-4,6-dichloro-1,3,5-triazine. | Cr | ...do... | |
| 81 | 1-aminonaphthalene-3,6-disulfonic acid. | | | ...do... | 2,5,6-tribromo-4-methylpyrimidine. | Cu | Gray-blue | |
| 82 | ...do... | | | ...do... | 2-dimethylamino-4,6-dichloro-1,3,5-triazine. | Cu | ...do... | |
| 83 | 1-amino-2-chlorobenzene-3,5-disulfonic acid. | | | 1-(3'-R-amino-2'-methyl-5'-sulfophenyl)-5-pyrazolone-3-carboxylic acid. | 2-di-(3'-hydroxypropyl)-amino-4,6-dichloro-1,3,5-triazine. | Co | Brown | |
| 84 | 1-aminonaphthalene-4,7-disulfonic acid. | | | ...do... | 2,4'6-tribromo-5-ethylpyrimidine. | Co | ...do... | |
| 85 | 1-aminobenzene-2,5-disulfonic acid. | | | 1-(3'-R-amino-2'-methyl-5'-sulfophenyl)-5-pyrazolone-3-carboxylic acid. | α,β-dichloroacrylyl-chloride. | Co | Brown | |
| 86 | 1-aminonaphthalene-7-sulfonic acid. | | | ...do... | 2-(4'-sulfophenyl-amino)-4,6-dichloro-1,3,5-triazine. | Co | | Brown. |
| 87 | ...do... | | | 2-R-amino-3-hydroxynaphthalene-6-sulfonic acid. | 2-(2'-carboxyphenyl-amino)-4,6-dichloro-1,3,5-triazine. | Co | | Do. |
| 88 | 1-aminobenzene-3-sulfonic acid. | | | ...do... | 2-(2'-hydroxypropyl-amino)-4,6-dichloro-1,3,5-triazine. | Co | | Do. |
| 89 | ...do... | | | 1-R-amino-3-hydroxybenzene (acid coupling). | 2-(2'-sulfoethylamino)-4,6-dichloro-1,3,5-triazine. | Cr | Brown | |
| 90 | ...do... | | | 1-R-amino-2-methoxy-5-hydroxybenzene (acid coupling). | 2-(2'4'-disulfophenylamino)-4,6-dichloro-1,3,5-triazine. | Cr | ...do... | |
| 91 | ...do... | | | 1-R-amino-7-hydroxynaphthalene. | 2-(2',5'-disulfophenylamino)-4,6-dichloro-1,3,5-triazine. | Co | | Blue. |
| 92 | 2-aminonaphthalene-6-sulfonic acid. | | | 1-R-amino-8-hydroxynaphthalene-4,6-disulfonic acid. | 2,4,5-trichloropyrimidine. | Co | Black | |
| 93 | ...do... | | | ...do... | 2,4,6-tribromo-5-carboxymethylpyrimidine. | Co | ...do... | |
| 94 | 1-aminonaphthalene-4,6,8-trisulfonic acid. | | | 1-R-amino-8-hydroxynaphthalene-4,6-disulfonic acid. | 2,4,6-tribromo-5-carbethoxypyrimidine. | Cu | Gray-blue | |
| 95 | ...do... | | | 1-(3'-R-aminophenyl)-3-methyl-5-pyrazolone. | 2,6-dichloro-4-methylpyrimidine. | Cr | Red-brown | |
| 96 | ...do... | | | ...do... | Methacrylyl chloride | Cr | ...do... | |
| 97 | ...do... | | | ...do... | 2-(N-methyl-N-carboxymethylamino)-4,6-dichloro-1,3,5-triazine. | Cr | ...do... | |
| 98 | ...do... | | | ...do... | 2,4,6-trichloropyrimidine. | Cr | ...do... | |
| 99 | ...do... | | | 1-R-amino-3-hydroxybenzene (acid coupling). | 2,4-dichloro-5-chloromethylpyrimidine. | Co | Brown | |
| 100 | 2-aminonaphthalene-6,8-disulfonic acid. | | | ...do... | 2-(N-methyl-N-2'-sulfoethylamino)-4,6-dichloro-1,3,5-triazine. | Cr | ...do... | |
| 101 | ...do... | | | 1-(4'-R-amino-2'-sulfophenyl)-3-methyl-5-pyrazolone. | 2,4-dibromo-5-bromomethylpyrimidine. | Cr | Red-brown | |
| 102 | ...do... | | | ...do... | α,β-dichloropropionyl chloride. | Cr | ...do... | |

| Example No. | $(HO_3S)_n$—A— = Radical of (I) | Nucleus C Substituent (II) | Nucleus C Position (III) | OH \| —B—NH—R = Radical of (IV) | R = Radical of (V) | Metal (VI) | Shade of the print or dyeing on cotton (VII) | Shade of the dyeing on wool (VIII) |
|---|---|---|---|---|---|---|---|---|
| 103 | 2-aminonaphthalene-3,5,7-trisulfonic acid. | | | 2-R-amino-6-hydroxy-naphthalene-8-sulfonic acid. | 2,4,6-trichloro-5-allyl-pyrimidine. | Cu | Brown | |
| 104 | 2-aminonaphthalene-3,5,7-trisulfonic acid. | | | 2-R-amino-6-hydroxy-naphthalene-8-sulfonic acid. | β-chlorocrotonyl chloride. | Cu | Brown | |
| 105 | ...do | | | ...do | 1-(4'-carboxyphenyl-amino)-4,6-dichloro-1,3,5-triazine. | Cu | ...do | |
| 106 | 2-aminonaphthalene-4,8-disulfonic acid. | | | 1-R-amino-8-hydroxy-naphthalene-3,6-disulfonic acid. | ...do | Cu | Gray-blue | |
| 107 | ...do | | | ...do | 2,4-dichloro-5-chloromethyl-6-methyl-pyrimidine. | Cu | ...do | |
| 108 | ...do | $CH_3$ | 5 | ...do | γ-bromocrotonyl chloride. | Cu | ...do | |
| 109 | ...do | | | ...do | β-chloropropionyl chloride. | Cu | ...do | |
| 110 | 1-amino-4-chlorobenzene-2-sulfonic acid. | | | ...do | 2,6-dibromopyrimidine. | Cr | Olive | |
| 111 | 1-amino-4-chlorobenzene-3-sulfonic acid. | | | ...do | 2,4,6-trichloro-5-carb-ethoxypyrimidine. | Cr | ...do | |
| 112 | ...do | | | ...do | 2-(2'-ethoxyethyl-amino)-4,6-dichloro-1,3,5-triazine. | Cr | ...do | |
| 113 | 1-aminobenzene-2,5-disulfonic acid. | | | ...do | 2,6-dibromo-4-carbethoxypyrimidine. | Cu | Gray-blue | |
| 114 | ...do | $CH_3O$ | 5 | ...do | 2,4,6-tribromopyrimidine. | Cu | ...do | |
| 115 | 1-amino-benzene-2-sulfonic acid. | $C_2H_5$ | 5 | 1-R-amino-8-hydroxy-naphthalene-3,6-disulfonic acid. | 2,4,6-trichloropyrimidine. | Cr | | Olive. |
| 116 | 1-amino-2-methyl-benzene-4-sulfonic acid. | | | ...do | ...do | Cr | | Do. |
| 117 | 1-aminonaphthalene-7-sulfonic acid. | $C_2H_5O$ | 5 | ...do | 2,4,5,6-tetrachloro-pyrimidine. | Cr | | Do. |
| 118 | 1-amino-2-methyl-benzene-3,5-disulfonic acid. | | | ...do | ...do | Cu | Gray-blue | |
| 119 | ...do | | | ...do | 2-amino-4,6-dibromo-1,3,5-triazine. | Cu | ...do | |
| 120 | ...do | | | 1-R-amino-5-hydroxy-naphthalene-7-sulfonic acid. | 2,4-dibromo-5-bromomethyl-6-methyl-pyrimidine. | Co | | Blue. |
| 121 | 2-aminonaphthalene-3,6-disulfonic acid. | | | ...do | 2-(4'-sulfophenyl-amino)-4,6-dibromo-1,3,5-triazine. | Co | | Do. |
| 122 | ...do | Br | 5 | 2-R-amino-5-hydroxy-naphthalene-1,7-disulfonic acid. | 2,4,6-trichloropyrimidine. | Cu | Brown | |
| 123 | 1-amino-4-methoxy-benzene-3-sulfonic acid. | | | ...do | ...do | Cr | | Blue. |
| 124 | 1-amino-2-methylbenzene-5-sulfonic acid. | | | ...do | ...do | Cr | | Do. |
| 125 | 1-amino-2-methyl-benzene-5-sulfonic acid. | | | 2-R-amino-5-hydroxy-naphthalene-1,7-disulfonic acid. | Chloracetyl chloride | Cr | | Blue. |
| 126 | 1-aminonaphthalene-4,6-disulfonic acid. | | | 1-(4'-R-aminophenyl)-3-methyl-5-pyrazolone. | 2,4,5,6-tetrachloro-pyrimidine. | Co | Brown | Brown. |
| 127 | ...do | $CH_3$ | 5 | ...do | β-chloropropionyl chloride. | Co | ...do | Do. |
| 128 | 2-aminonaphthalene-4,6,8-trisulfonic acid. | F | 5 | ...do | 2,4,5,6-tetrachloro-pyrimidine. | Cr | Red-brown | Red-brown. |
| 129 | 1-aminobenzene-2-sulfonic acid. | | | ...do | 2-(2'-sulfoethyl-amino)-4,6-dibromo-1,3,5-triazine. | Cr | | Do. |
| 130 | ...do | | | ...do | 2-(2',5'-disulfophenyl-amino)-4,6-dichloro-1,3,5-triazine. | Cr | | Do. |

Formulae of representative dyes of the foregoing examples are as follows:

*Example 1*

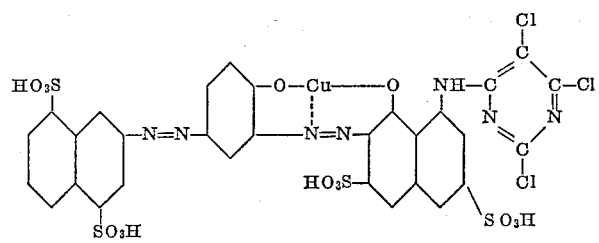

Example 2
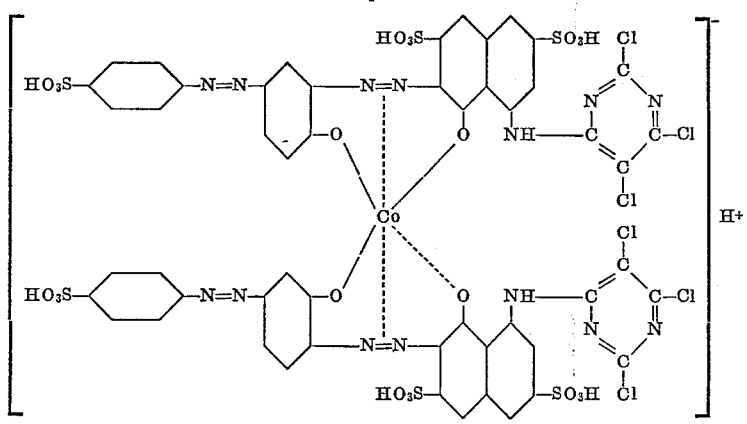
Example 3
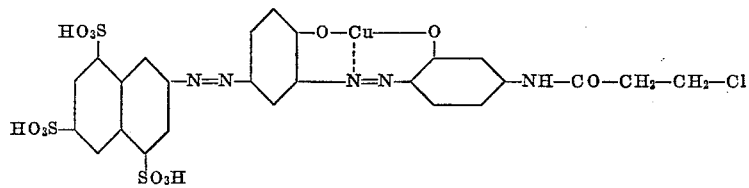
Example 4
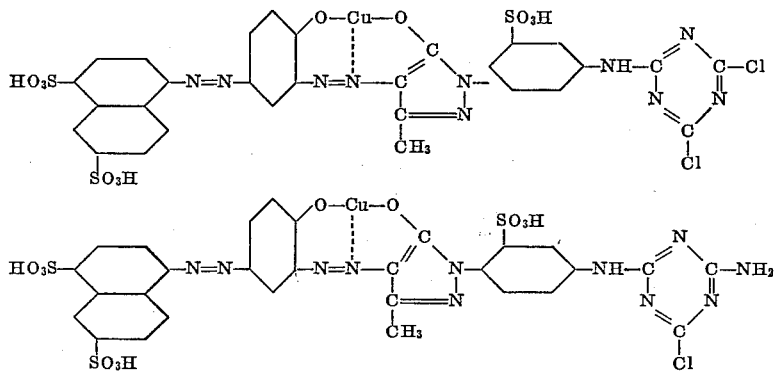
Example 13
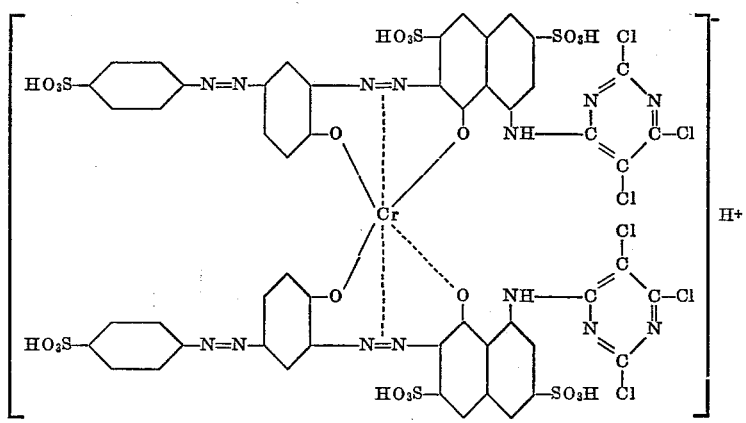

Example 14

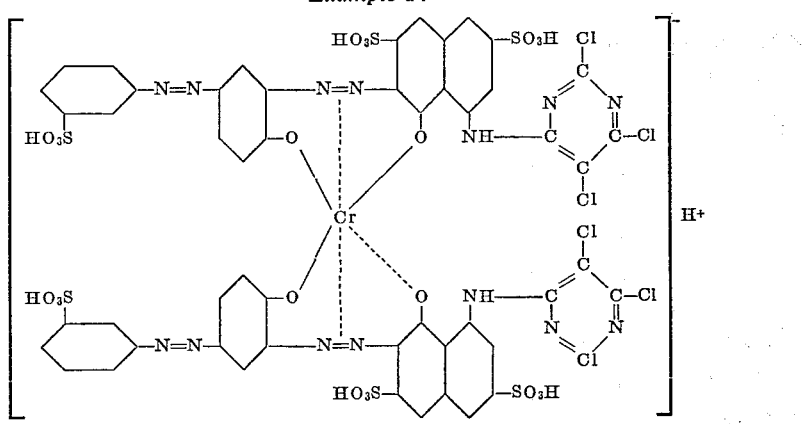

Example 18

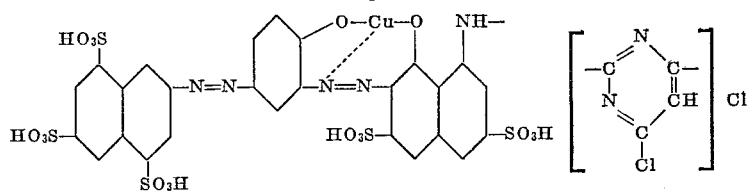

mixture of the 4,6-dichloropyrimidyl-2-amino and 2,4-dichloropyrimidyl-6-amino dye.

Example 107

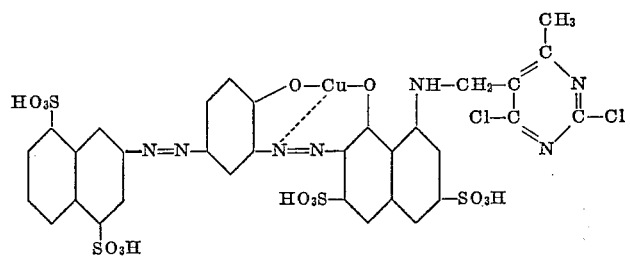

On condensing 2,4,5-trichloro- or 2,4,5-tribromopyrimidine with an amino dye, a mixture of the 2,5-dichloro- or 2,5-dibromo-pyrimidyl-4-amino dye and of the 4,5-dichloro or 4,5-dibromopyrimidyl-2-amino dye is very probably obtained.

Similarly on condensing 2,6-dichloro- or 2,6-dibromopyrimidine or their derivatives with an amino dye, a mixture of the 2-chloro- or 2-bromopyrimidyl-6-amino dye and of the 6-chloro- or 6-bromopyrimidyl-2-amino dye is very probably obtained.

The derivatives of 2,4,6-trichloro- or 2,4,6-tribromopyrimidine bearing in the 5-position a substituent other than halogen give mixtures similar to those produced with 2,4,6-trichloro- or 2,4,6-tribromopyrimidine (cf. formula of Example 18), whereas 2,4,6-trichloro-5-chloromethyl-pyrimidine and 2,4,6-tribromo-5-bromomethyl-pyrimidine react in the same manner as 2,4-dichloro-5-chloromethylpyrimidine and 2,4 - dichloro-5-chloromethyl-6-methylpyrimidine (cf. formula of Example 107).

Having thus disclosed the invention what we claim is:

1. A metal complex compound selected from the group consisting of the copper, nickel, cobalt and chromium complex compounds of the water-soluble diazo dyes of the formula

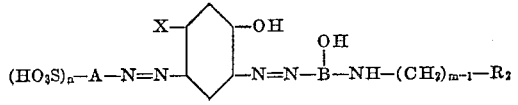

wherein

A represents a member selected from the group consisting of a radical of the benzene series and a radical of the naphthalene series, B represents the radical of a coupling component selected from the group consisting of the pyrazolone, the benzene and the naphthalene series, which bears the hydroxy group in adjacent position to the azo group, X represents a member selected from the group consisting of hydrogen, halogen with an atomic weight between 18 and 81, lower alkyl and lower alkoxy, $R_2$ is dihalogenopyrimidyl which bears a further substituent selected from the group consisting of hydrogen, chlorine, bromine, lower alkyl, allyl, chlorovinyl, bromovinyl, —COO— lower alkyl and

—CH$_2$—COOH $m$ being one of the integers 1 and 2, and halogen having an atomic weight between 35 and 81, and $n$ represents one of the integers 1, 2 and 3.

2. The dye of the formula

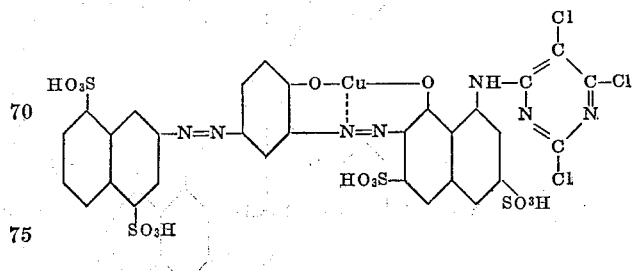

3. The dye of the formula
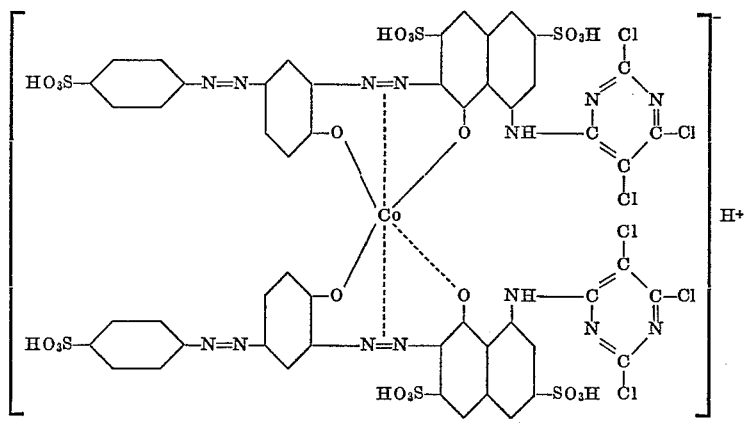
4. The dye of the formula
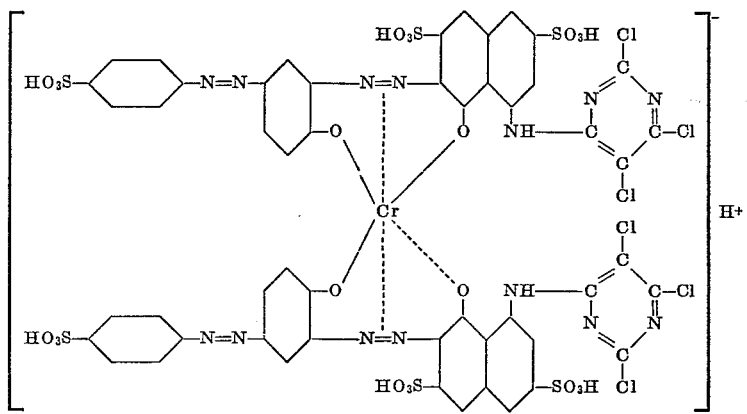
5. The dye of the formula
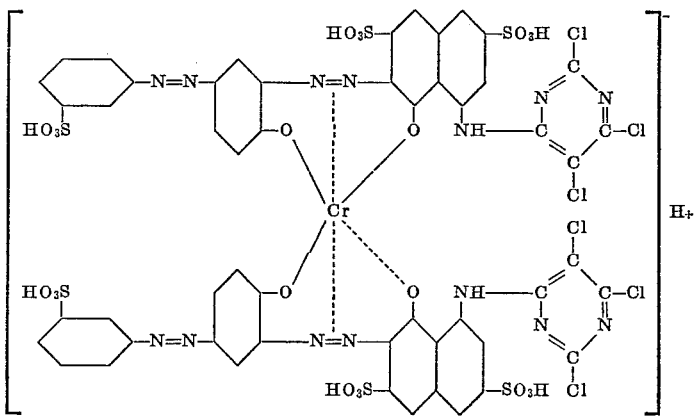
6. The dye of the formula
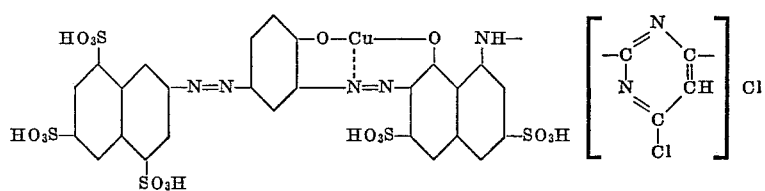
mixture of the 4,6-dichloropyrimidyl-2-amino and 2,4-dichloropyrimidyl-6-amino dye 7. The dye of the formula
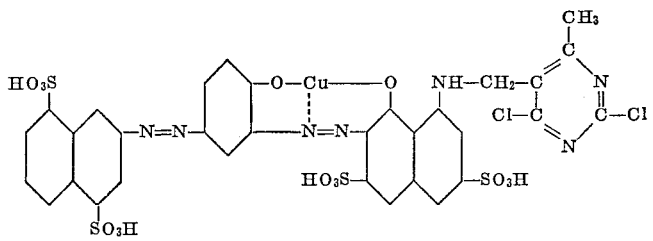
References Cited by the Examiner
UNITED STATES PATENTS
| | | | |
|---|---|---|---|
| 2,779,758 | 1/1957 | Neier et al. | 260—147 X |
| 2,803,625 | 8/1957 | Putter | 260—147 X |
| 3,036,058 | 5/1962 | Andrew et al. | 260—146 |
| 3,038,893 | 6/1962 | Andrew et al. | 260—146 |
| 3,057,844 | 10/1962 | Andrew et al. | 260—153 X |
| 3,116,275 | 12/1963 | Gamlen et al. | 260—146 |
| 3,120,507 | 2/1964 | Andrew et al. | 260—146 |
FOREIGN PATENTS
1,225,281   2/1960   France.
CHARLES B. PARKER, *Primary Examiner.*
LEON ZITVER, JOSEPH BRUST, *Examiners.*